US011619561B1

(12) United States Patent
Lee et al.

(10) Patent No.: US 11,619,561 B1
(45) Date of Patent: Apr. 4, 2023

(54) FAN INSPECTION JIG

(71) Applicant: ASIA VITAL COMPONENTS CO., LTD., New Taipei (TW)

(72) Inventors: Jyh-Ren Lee, New Taipei (TW); Yi-Hong Liao, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 17/486,812

(22) Filed: Sep. 27, 2021

(51) Int. Cl.
   *G01M 1/04* (2006.01)
   *G01M 1/22* (2006.01)
   *F04D 29/00* (2006.01)

(52) U.S. Cl.
   CPC ............. *G01M 1/04* (2013.01); *F04D 29/002* (2013.01); *G01M 1/22* (2013.01)

(58) Field of Classification Search
   CPC ....... G01M 1/22; G01M 99/005; G01P 1/023; G01H 1/003
   See application file for complete search history.

(56) References Cited

U.S. PATENT DOCUMENTS

| 4,807,718 | A | * | 2/1989 | Lotz | H02K 5/24 |
| | | | | | 181/225 |
| 7,481,116 | B1 | * | 1/2009 | Osborn | G01M 1/22 |
| | | | | | 73/660 |
| 2007/0288181 | A1 | * | 12/2007 | Kuo | G01M 7/02 |
| | | | | | 702/56 |
| 2012/0128492 | A1 | * | 5/2012 | Liedel | F16F 15/32 |
| | | | | | 416/145 |
| 2013/0167657 | A1 | * | 7/2013 | Chang | F04D 27/001 |
| | | | | | 73/861.85 |
| 2014/0190261 | A1 | * | 7/2014 | Satterfield | G01H 1/003 |
| | | | | | 73/579 |
| 2018/0347591 | A1 | * | 12/2018 | Serrano | B23K 26/36 |
| 2019/0094105 | A1 | * | 3/2019 | Tang | G01H 1/003 |
| 2021/0321544 | A1 | * | 10/2021 | Cheng | H05K 7/20836 |

FOREIGN PATENT DOCUMENTS

| CN | 109406055 | A | * | 3/2019 | ............. G01M 1/16 |
| DE | 102018213810 | A1 | * | 2/2020 | |
| EP | 1473555 | A2 | | 11/2004 | |
| KR | 0131015 | Y1 | * | 5/1999 | |
| KR | 20110057402 | A | * | 6/2011 | |
| KR | 20120068219 | A | * | 6/2012 | |
| TW | M406738 | | | 7/2011 | |
| TW | I429892 | | | 3/2014 | |
| TW | M622551 | | | 1/2022 | |

OTHER PUBLICATIONS

Search Report dated Jun. 28, 2022 issued by Taiwan Intellectual Property Office for counterpart application No. 110134924.

* cited by examiner

*Primary Examiner* — Alexander A Mercado
(74) *Attorney, Agent, or Firm* — Bradley J. Thorson; DeWitt LLP

(57) ABSTRACT

A fan inspection jig includes a jig assembly having multiple spring abutment pillars for holding two sides of a fan (or a series fan) to make the fan or the series fan positioned in a suspending position. A vibration sensor is disposed in at least one of the spring abutment pillars of two sides of the fan for measuring a vibration signal of the fan in operation.

10 Claims, 9 Drawing Sheets

FAN INSPECTION JIG

BACKGROUND OF THE INVENTION

1. Field of the Invention

The present invention relates generally to a jig field, and more particularly to an inspection jig for inspecting a fan.

2. Description of the Related Art

Fan vibration inspection is to inspect the vibration value generated by each fan of the same model number or specification and then wash out those fans with unqualified vibration value so as to ensure the quality of the produced fans. In the conventional fan inspection, for example, the fan frame of the fan is perforated to securely lock an accelerometer on the fan frame or adhere an accelerometer on the fan frame for measuring the vibration value generated by the fan in operation.

Alternatively, the fan is placed on a vibration support table or a sucker and the accelerometer is disposed on the vibration support table or the sucker to measure the vibration value generated by the fan in operation.

Still alternatively, the accelerometer is disposed on a rigid holder for holding the fan, whereby the accelerometer can measure the vibration value generated by the fan in operation.

However, in the case that the accelerometer is adhered to or locked on the fan frame, it is necessary to clean up the adhesive and such operation can be only performed to those tested articles with suitable locking holes or increase the mass of the measurement path to cause mass effect. The mass effect will lead to measurement error. With respect to the rigid holder, not only the affection of the aforesaid mass effect still exists, but also the configuration of the surface of the tested article and the position change of the holding contact points of the holder will lead to errors of the measured value.

It is therefore tried by the applicant to provide an improved fan inspection jig to solve the above problems existing in the conventional fan inspection technique.

SUMMARY OF THE INVENTION

It is therefore a primary object of the present invention to provide a fan inspection jig, which can hold a fan to make the fan positioned in a suspending position, whereby a vibration sensor can measure a fan vibration signal of the fan in operation.

It is a further object of the present invention to provide the above fan inspection jig, which includes soft pads to provide proper softness to partially contact a tested article. This reduces the error of the measured value due to the position change of the holding contact points of the jig.

It is still a further object of the present invention to provide the above fan inspection jig, which includes a fixed base seat. Multiple locating sections are arranged on the fixed base seat at intervals. The locating sections are spaced from a movable base seat by different distances. By means of the locating sections, the distance between the fixed base seat and the movable base seat is adjustable.

It is still a further object of the present invention to provide the above fan inspection jig, which includes a movable base section connected with a displacement module. By means of the displacement module, the movable base seat can be retreated relative to a fixed base seat, whereby one single fan or a series fan with different thicknesses can be held between the fixed base seat and the movable base seat.

To achieve the above and other objects, the present invention provides a fan inspection jig for inspecting a fan with multiple mounting holes. The fan inspection jig includes a jig assembly having multiple spring abutment pillars for holding two sides of the fan. Each of the spring abutment pillars includes: a front case body having a first front end, a first rear end and a chamber, a soft pad being overlaid on the first front end to contact a fan frame of the fan by a face, a pin member outward protruding from the first front end to pass through the soft pad in adaptation to the fan mounting hole, the chamber being positioned between the first front end and the first rear end; a rear case body having a second front end and a second rear end, the second front end facing the first rear end of the front case body, the second rear end being connected with the jig assembly; and an elastic member having a first connection end and a second connection end respectively connected with the first rear end of the front case body and the second front end of the rear case body. The elastic member further has a hollow passage between the first connection end and the second connection end. A vibration sensor is disposed in the chamber of at least one of the spring abutment pillars of two sides of the fan for measuring a vibration signal of the fan in operation.

In the above fan inspection jig, the jig assembly further includes a fixed base seat and a movable base seat, which is forward or backward movable relative to the fixed base seat. A hollow space is defined between the fixed base seat and the movable base seat. The spring abutment pillars are respectively connected with the fixed base seat and the movable base seat for holding and suspending the fan in the hollow space.

In the above fan inspection jig, a lifting bracket is disposed under the hollow space for placing the fan thereon. The lifting bracket is connected with a lifting drive module. The lifting drive module includes a lifting rod and a lifting drive source. One end of the lifting rod is connected with the lifting bracket, while the other end of the lifting rod is connected with the lifting drive source.

In the above fan inspection jig, the movable base seat has a movable base section connected with an extendable drive module. The extendable drive module has an extendable rod set, an extendable drive source and a connection rod set. The connection rod set has two elongated straight rods and a transverse bar. The two elongated straight rods are arranged in parallel to each other. One end of the elongated straight rods is connected with the movable base section, while the other end of the elongated straight rods is connected with the transverse bar. One end of the extendable rod set is connected with the transverse bar, while the other end of the extendable rod set is connected with the extendable drive source.

In the above fan inspection jig, the movable base section has two shaft holes, in which the two elongated straight rods of the extendable drive module are fitted. The movable base section is connected with a displacement module positioned between the extendable drive module and the movable base section. The displacement module has a fixed section positioned between the movable base section and the transverse bar of the extendable drive module. At least one elastic unit is connected between the movable base section and the fixed section.

In the above fan inspection jig, the fixed base seat has a fixed base section. The fixed base section has multiple locating sections arranged at intervals. The locating sections are spaced from the movable base seat by different distances, whereby a distance between the fixed base seat and the movable base seat is adjustable.

In the above fan inspection jig, the front case body is formed with at least one perforation in communication with the chamber. At least one retainer member has an abutment end is passed through the perforation into the chamber to abut against the vibration sensor. The first rear end of the front case body has a rear protruding body, which protrudes and extends into the hollow passage of one of the connection ends of the elastic member. A rear protruding wall protrudes from an outer periphery of the first rear end around the rear protruding body. The first connection end of the elastic member is positioned between the rear protruding body and the rear protruding wall.

In the above fan inspection jig, a front protruding body is disposed at the second front end of the rear case body and correspondingly spaced from the rear protruding body of the front case body. The front protruding body protrudes and extends into the hollow passage of the other connection end of the elastic member. A front protruding wall protrudes from an outer periphery of the second front end around the front protruding body. The second connection end of the elastic member is positioned between the front protruding body and the front protruding wall.

In the above fan inspection jig, the rear protruding body of the front case body is a conic body having a conic end. The front protruding body of the rear case body is a hollow cylindrical body having a shaft hole corresponding to the conic end of the rear protruding body.

In the above fan inspection jig, each vibration sensor has a signal connector connected with a signal wire.

Still to achieve the above and other objects, the present invention provides a spring abutment pillar of a fan inspection jig for holding and suspending a fan with multiple mounting holes. The spring abutment pillar includes: a front case body having a first front end, a first rear end and a chamber, a soft pad being overlaid on the first front end to contact a fan frame of the fan by a face, a pin member outward protruding from the first front end to pass through the soft pad in adaptation to the fan mounting hole, the chamber being positioned between the first front end and the first rear end for receiving a vibration sensor therein; a rear case body disposed behind the front case body and spaced from the front case body, the rear case body having a second front end and a second rear end, the second front end facing the first rear end of the front case body, the second rear end being connected with a jig assembly of an inspection jig; and an elastic member connected between the front case body and the rear case body. The elastic member has a first connection end connected with the first rear end of the front case body and a second connection end connected with the second front end of the rear case body. The elastic member further has a hollow passage passing through the elastic member and extending from the first connection end to the second connection end.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

In the description of the present invention, unless there are other specific regulations and definitions, the following terms "disposed", "mounted", "connection", "connected", "fixed", etc. should be generally interpreted. For example, the term "connected" can mean fixedly connected, detachably connected, mechanically connected, directly connected or indirectly connected via a medium. The substantial definitions of the above terms in the description of the present invention can be understood by those who are skilled in this field according to practical situation.

Moreover, the following terms "first" and "second" are only for illustration purposes and should not be interpreted as indication or implication of the relative importance or the number of the technical features. Accordingly, the features can be defined by the terms "first" and "second" to specifically indicate or imply that there are one or more features. In the description of the present invention, the terms "a plurality of" and "multiple" mean two or more than two unless there is other specific and substantial definition.

Figure 1A:
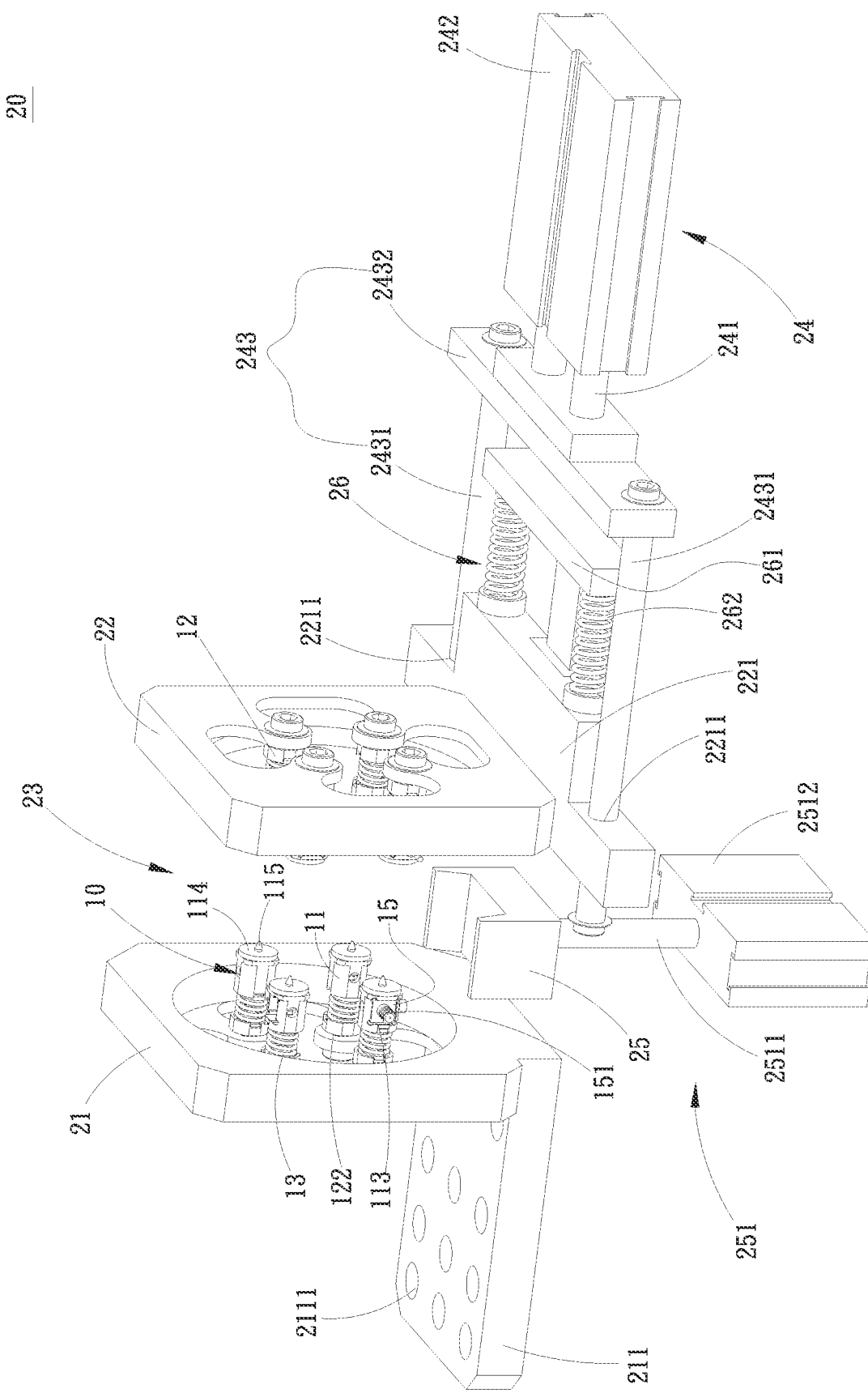
FIGS. 1A to 1C are schematic diagrams of the fan inspection jig of the present invention.
Figure 1B:
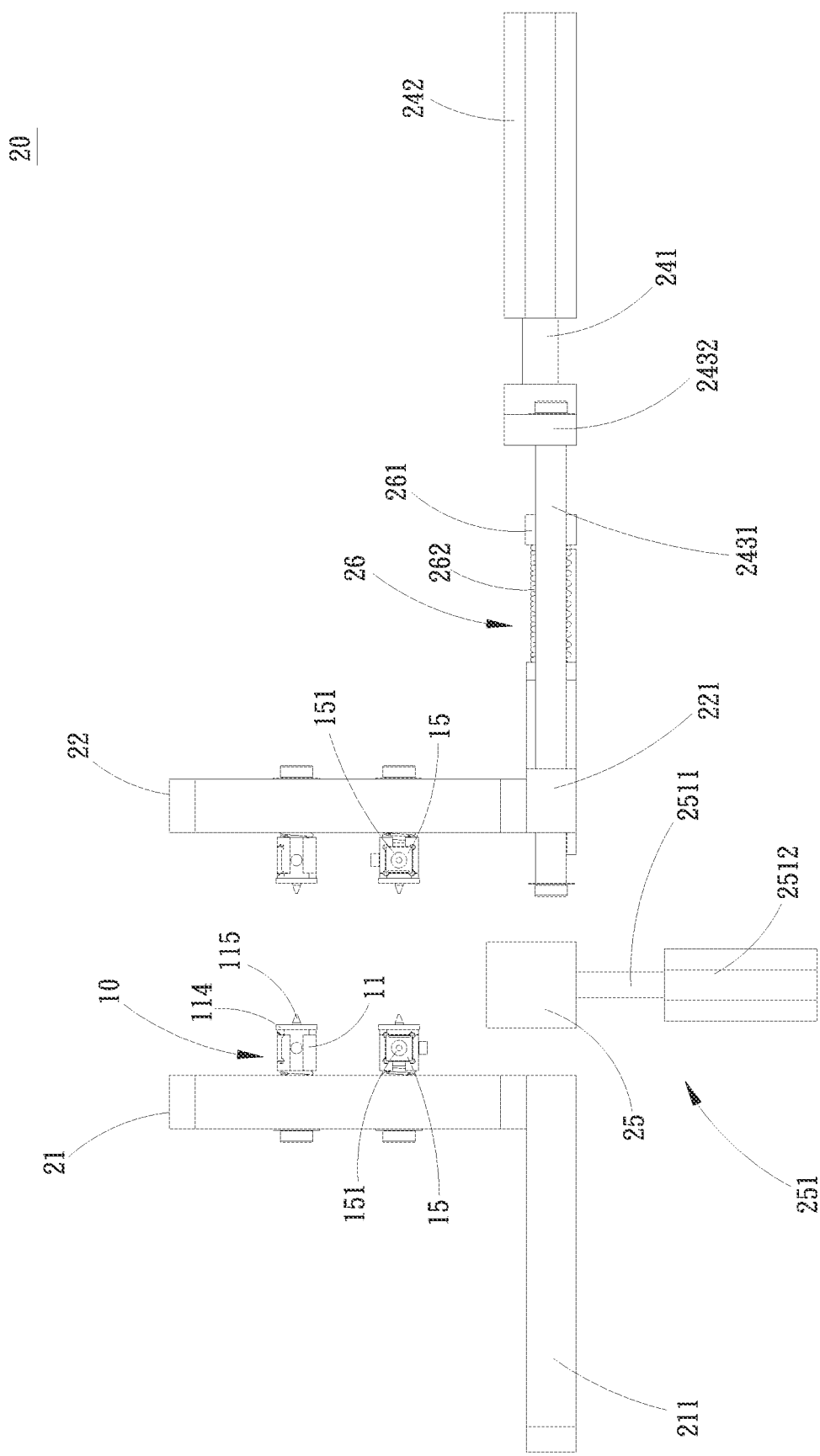
Figure 1C:
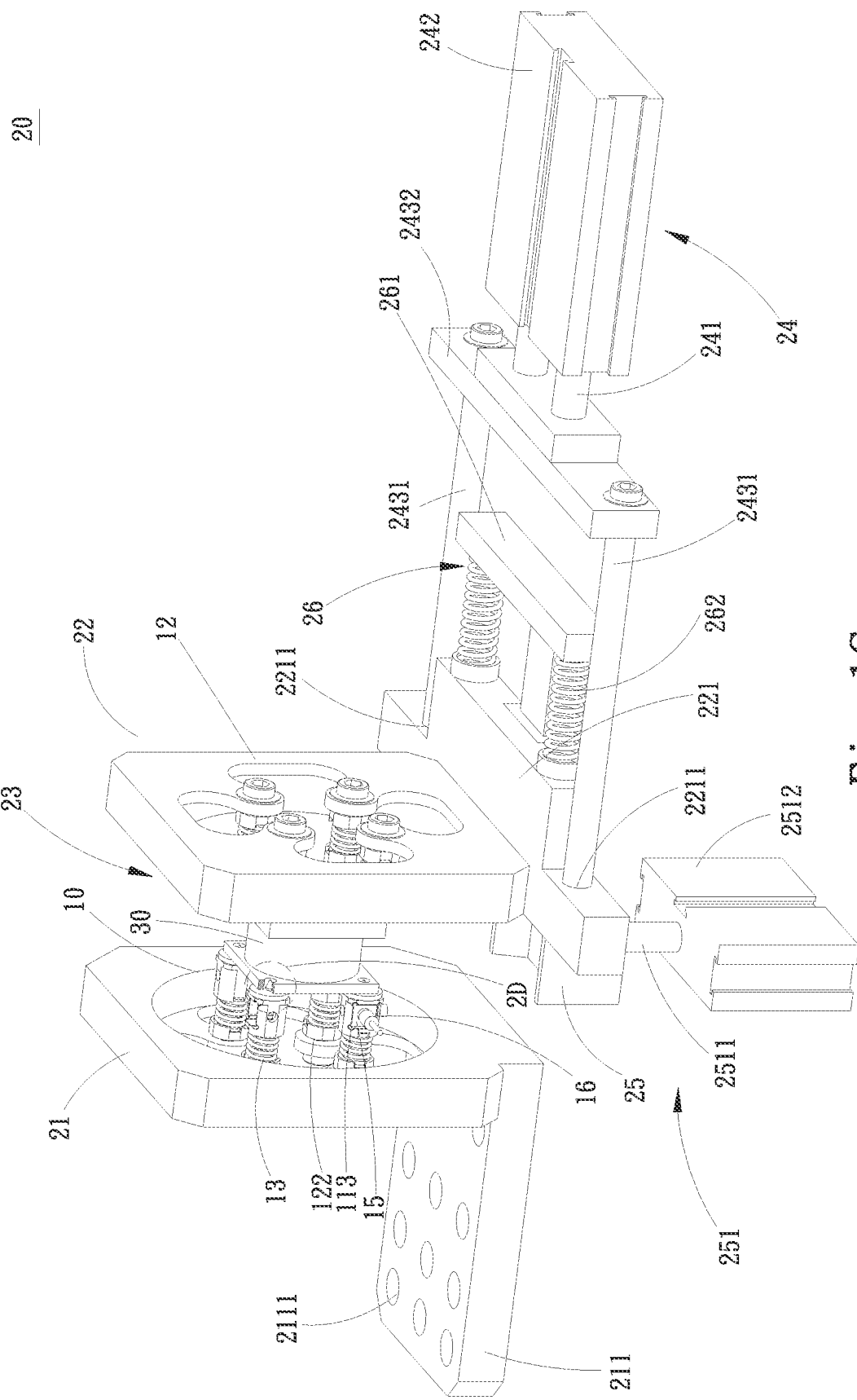
Figure 2A:
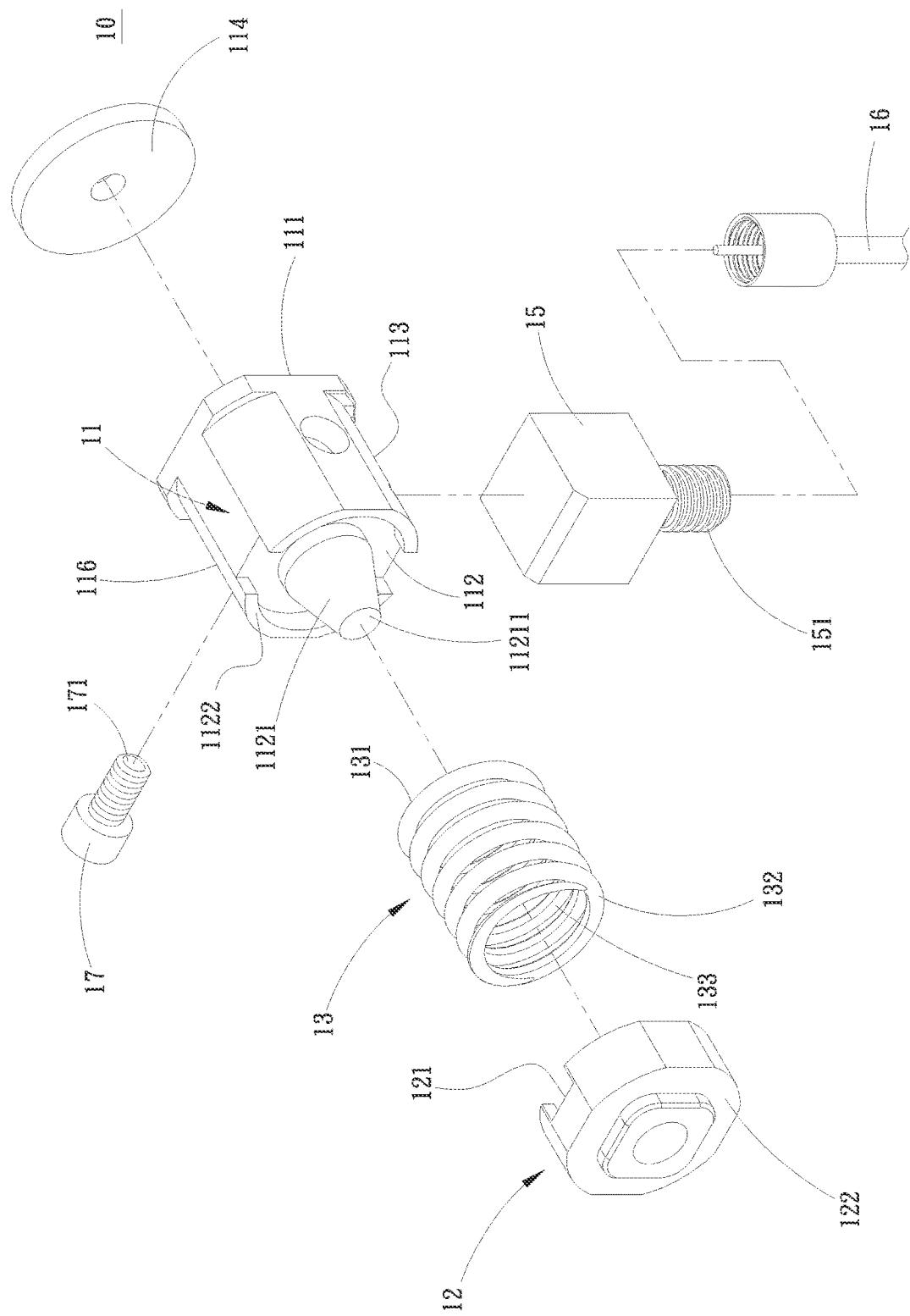
FIGS. 2A to 2D are perspective exploded views and perspective assembled views of the spring abutment pillar of the present invention, in which a vibration sensor is disposed.
Figure 2B:
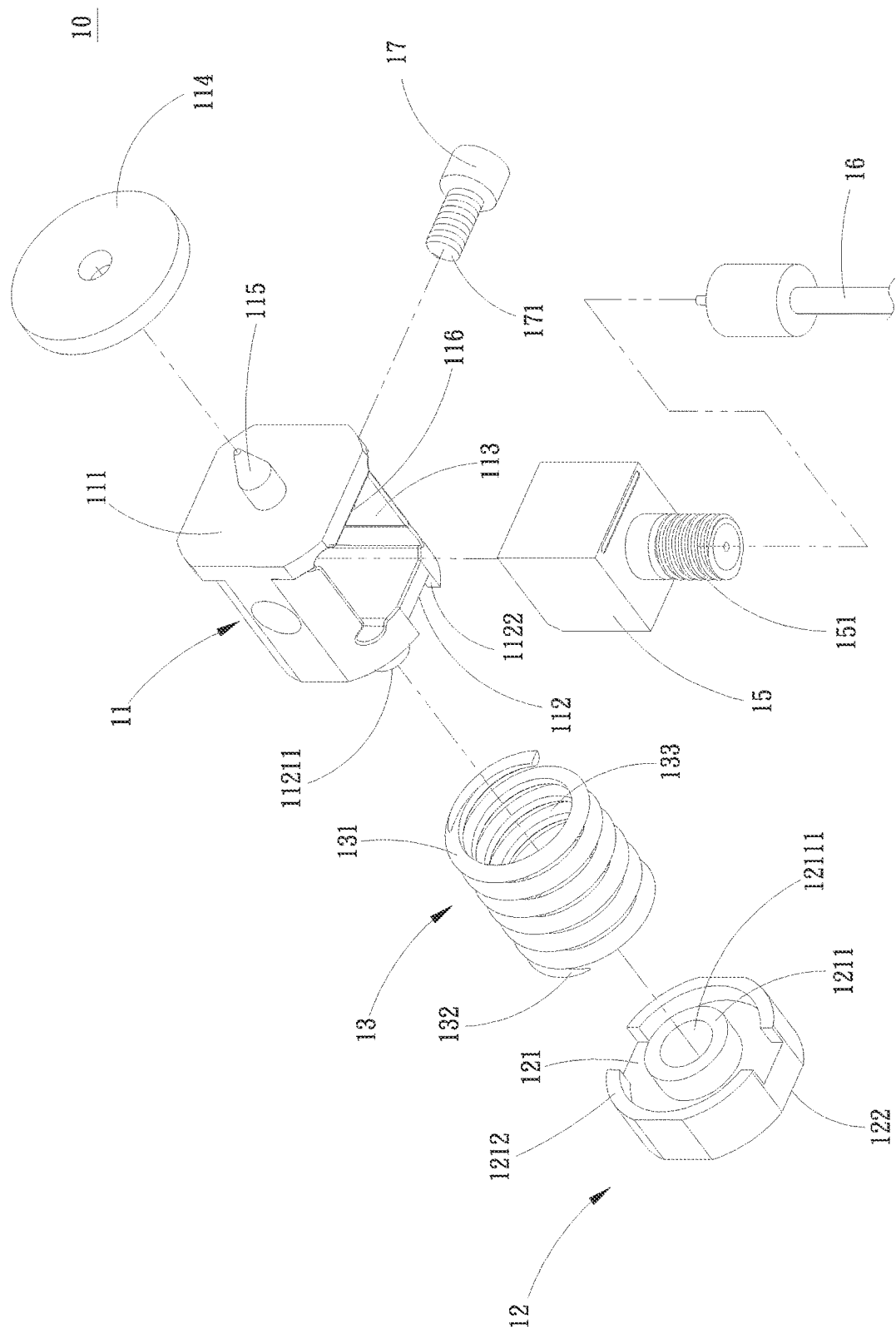
Figure 2C:
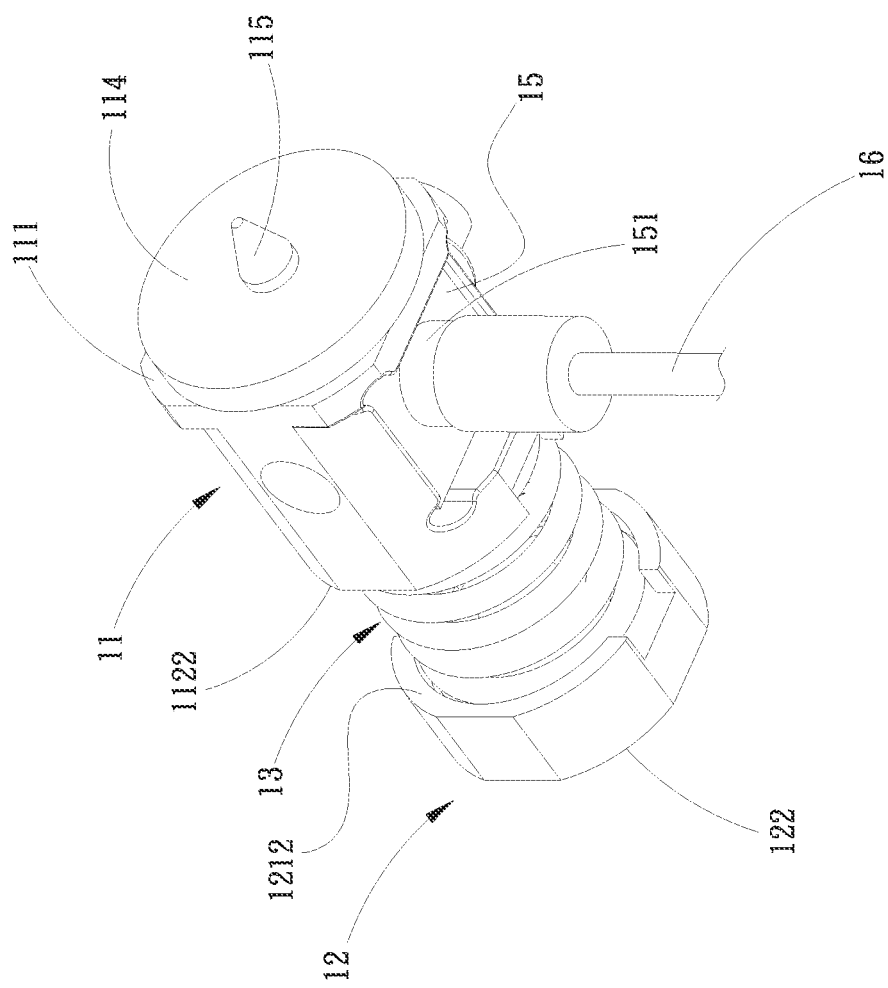
Figure 2D:
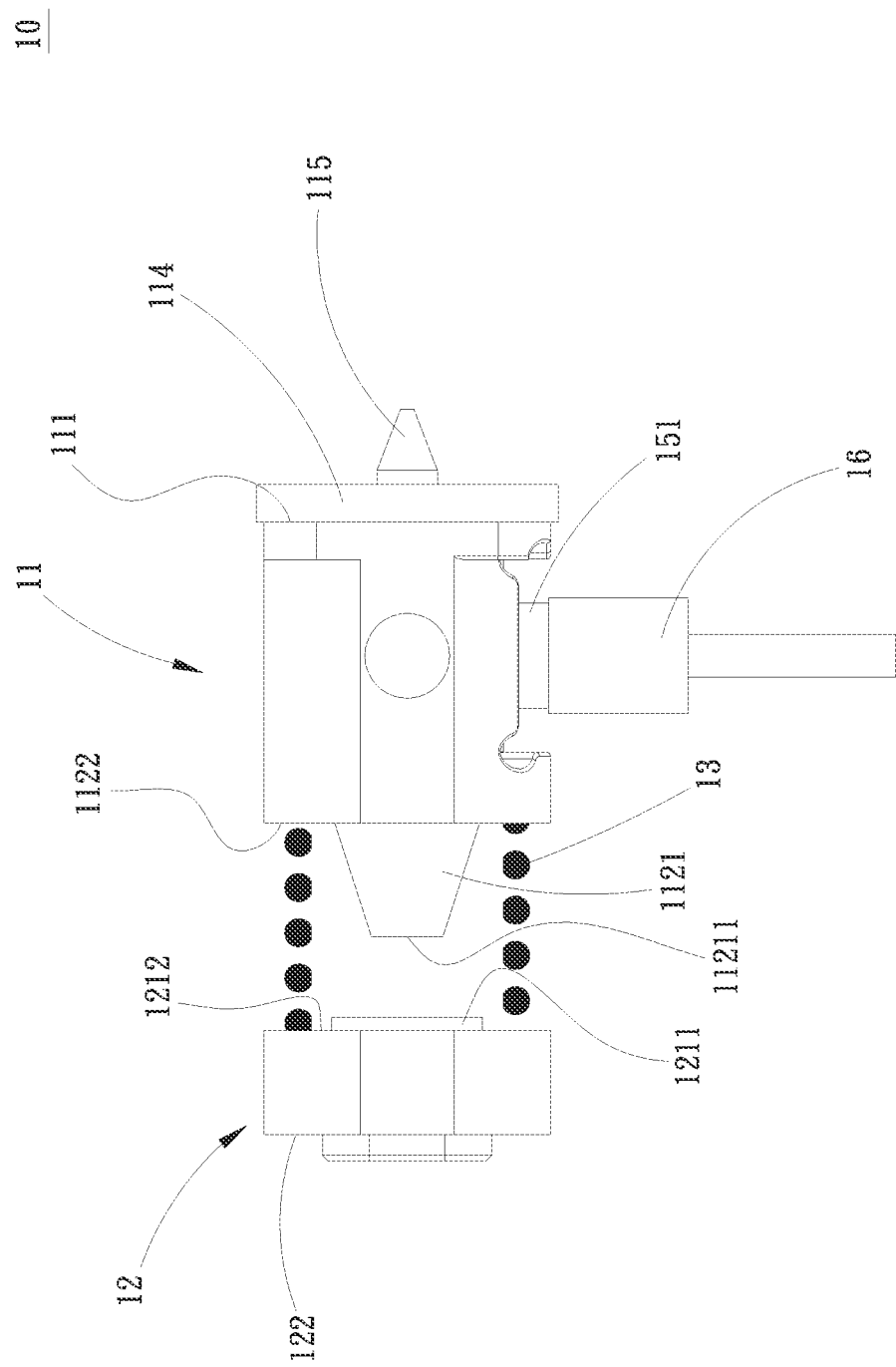

Please refer to FIGS. 1A to 1C, which are schematic diagrams of the fan inspection jig of the present invention. As shown in the drawings, the fan inspection jig of the present invention includes a jig assembly 20 disposed on the same plane face (such as a working table, etc.) The jig assembly 20 has a fixed base seat 21 and a movable base seat 22, which is forward or backward movable relative to the fixed base seat 21. A hollow space 23 is defined between the fixed base seat 21 and the movable base seat 22. A lifting bracket 25 is disposed under the hollow space 23. Each of the fixed base seat 21 and the movable base seat 22 has four symmetrical spring abutment pillars 10.

The fixed base seat 21 has a fixed base section 211 perpendicular to the fixed base seat 21. The fixed base section 211 has multiple locating sections 2111 arranged at intervals. As shown in the drawings, the locating sections 2111 are multiple rows of locking holes. The locating sections 2111 are spaced from the movable base seat 22 by different distances. By means of any of the locating sections 2111, the fixed base seat 21 can be connected on the plane face with the distance between the fixed base seat 21 and the movable base seat 22 adjustable.

The movable base seat 22 has a movable base section 221 connected with an extendable drive module 24. The extendable drive module 24 has an extendable rod set 241, an extendable drive source 242 and a connection rod set 243. The connection rod set 243 has two elongated straight rods 2431 and a transverse bar 2432. The two elongated straight rods 2431 are arranged in parallel to each other. One end of the elongated straight rods 2431 is connected with the movable base section 221, while the other end of the elongated straight rods 2431 is connected with the transverse bar 2432. One end of the extendable rod set 241 is connected with the transverse bar 2432, while the other end of the extendable rod set 241 is connected with the extendable drive source 242. The extendable drive source 242 serves to drive the extendable rod set 241 to extend or retract. Moreover, the connection rod set 243 is drivingly connected with the extendable rod set 241 so that the two elongated straight rods 2431 drive the movable base seat 22 to advance toward the fixed base seat 21 or retreat from the fixed base seat 21.

The movable base section 221 has two shaft holes 2211, in which the two elongated straight rods 2431 of the extendable drive module 24 are fitted, whereby the movable base section 221 is movable along with the two elongated straight rods 2431. In addition, the movable base section 221 is connected with a displacement module 26 positioned between the extendable drive module 24 and the movable base section 221. The displacement module 26 has a fixed section 261 disposed on the plane face and positioned between the movable base section 221 and the transverse bar 2432 of the extendable drive module 24. At least one elastic unit 262 such as a spring is connected between the movable base section 221 and the fixed section 261. As shown in the drawings, there are two elastic units 262, (that is, two springs) are disposed between the movable base section 221 and the fixed section 261 in parallel to each other. In addition, in a preferred embodiment, a bottom face of the movable base section 221 and the plane face (such as a working table) are respectively provided with a guide channel and a rail in adaptation to the guide channel, whereby the movable base section 221 can advance or retreat along the rail.

After the movable base seat 22 is driven by the two elongated straight rods 2431 to move forward toward the fixed base seat 21 to a predetermined position, the two shaft holes 2211 of the movable base section 221 are slightly moved backward along the two elongated straight rods 2431. At the same time, the elastic units 262 become in a compressed state, whereby the movable base seat 22 is moved in a direction away from the fixed base seat 21 by a short distance. Then the elastic units 262 apply an elastic force to the movable base seat 22. By means of such operation, one single fan or a series fan with different thicknesses can be held between the fixed base seat 21 and the movable base seat 22.

The lifting bracket 25 is connected with a lifting drive module 251. The lifting drive module 251 includes a lifting rod 2511 and a lifting drive source 2512. One end of the lifting rod 2511 is connected with the lifting bracket 25, while the other end of the lifting rod 2511 is connected with the lifting drive source 2512. In a preferred embodiment, the extendable drive source 242 and the lifting drive source 2512 are such as, but not limited to, pneumatic motors, hydraulic motors or electrical motors.

Please further refer to FIGS. 2A to 2D. Each of the spring abutment pillars 10 respectively disposed on the fixed base seat 21 and the movable base seat 22 includes a front case body 11 and a rear case body 12 as two segments and an elastic member 13 connected between the front case body 11 and the rear case body 12.

The front case body 11 has a first front end 111, a first rear end 112 and a chamber 113. The chamber 113 is positioned between the first front end 111 and the first rear end 112. A vibration sensor 15 is selectively received in the chamber 113 or not received in the chamber 113. The vibration sensor 15 is such as an accelerometer. In addition, the vibration sensor 15 has a signal connector 151 connected with a signal wire 16. The front case body 11 is formed with at least one perforation 116 in communication with the chamber 113. At least one retainer member 17 such as a screw having an abutment end 171 is screwed through the perforation 116 into the chamber 113 to abut against the vibration sensor 15 so as to secure the vibration sensor 15 in the chamber 113.

A soft pad 114 is overlaid on the first front end 111 of the front case body 11. A pin member 115 outward protrudes from the first front end 111 to pass through the soft pad 114. The pin member 115 is correspondingly plugged into a fan mounting hole of a fan frame of the fan. The soft pad 114 is a soft plastic pad made of a material, which is such as, but not limited to, rubber, plastics or silicone. The soft pad 114 is able to contact the fan frame of the fan by a face so as to more tightly hold the fan. Accordingly, the vibration of the fan in operation can be transmitted through the soft pad 14 to the spring abutment pillar 10 as lossless as possible and measured by the vibration sensor 15. In this embodiment, the soft pad 114 has a surface, which is a plane face. In a modified embodiment, the surface of the soft pad 114 is formed with several concentrically arranged waved stripes.

The first rear end 112 of the front case body 11 has a rear protruding body 1121 such as a conic body having a conic end 11211, which protrudes rearward. A rear protruding wall 1122 protrudes from an outer periphery of the first rear end 112 around the rear protruding body 1121.

The rear case body 12 is disposed behind the front case body 11 and spaced therefrom. The rear case body 12 has a second front end 121 and a second rear end 122. The second front end 121 faces the first rear end 112.

The second rear end 122 is connected with a jig assembly of an inspection jig. A front protruding body 1211 is disposed at the second front end 121 and correspondingly spaced from the rear protruding body 1121 of the front case body 11. The front protruding body 1121 is a hollow cylindrical body having a shaft hole 12111 corresponding to the conic end 11211 of the rear protruding body 1211 of the front case body 11. A front protruding wall 1212 protrudes from an outer periphery of the second front end 121 around the front protruding body 1211.

The elastic member 13 is such as a spring having a first connection end 131 and a second connection end 132. The elastic member 13 further has a hollow passage 133 passing through the elastic member 13 and extending from the first connection end 131 to the second connection end 132. The first connection end 131 to the second connection end 132 are respectively connected with the first rear end 112 of the front case body 11 and the second front end 121 of the rear case body 12 via connection means. To speak more specifically, the first connection end 131 is positioned between the rear protruding body 1121 and the rear protruding wall 1122, whereby the rear protruding body 1121 protrudes and extends into the hollow passage 133 of the first connection end 131 of the elastic member 13. The second connection end 132 is positioned between the front protruding body 1211 and the front protruding wall 1212, whereby the front protruding body 1211 protrudes and extends into the hollow passage 133 of the second connection end 132 of the elastic member 13. The connection means is such as, but not limited to, welding, screwing or adhesion.

The second rear ends 122 of the rear case bodies 12 of the spring abutment pillars 10 are respectively secured on the fixed base seat 21 and the movable base seat 22. In this embodiment, the second rear ends 122 of four spring abutment pillars 10 are securely locked with the fixed base seat 21 by means of screws and the second rear ends 122 of the other four spring abutment pillars 10 are securely locked with the movable base seat 22. In addition, a vibration sensor 15 is received in the chamber 113 of at least one spring abutment pillar 10 of the fixed base seat 21 and a vibration sensor 15 is received in the chamber 113 of at least one spring abutment pillar 10 of the movable base seat 22 for measuring a vibration signal of a fan in operation.

Figure 3A:
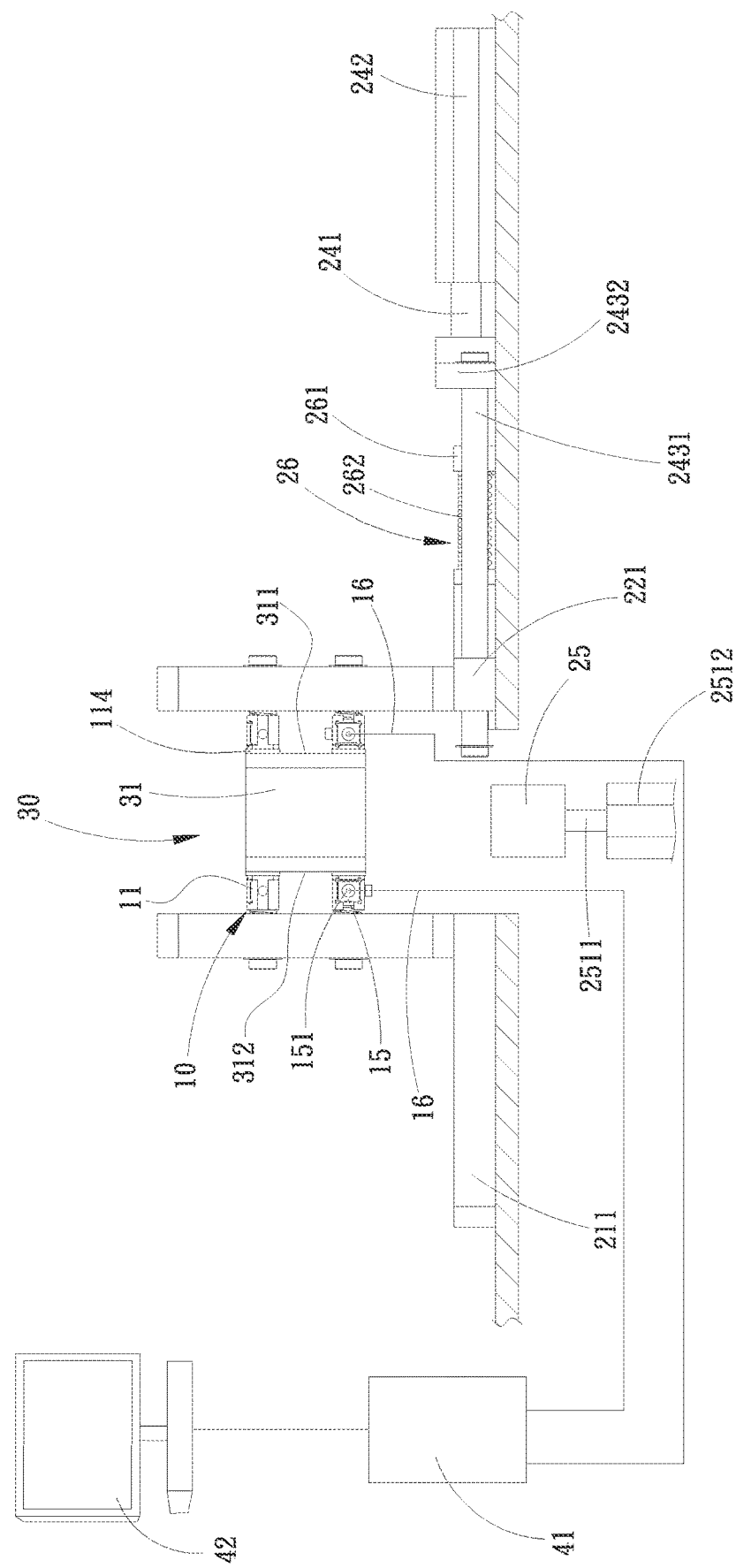
FIG. 3A is a schematic diagram showing that the fan inspection jig of the present invention measures the vibration signal of the fan.
Figure 3B:
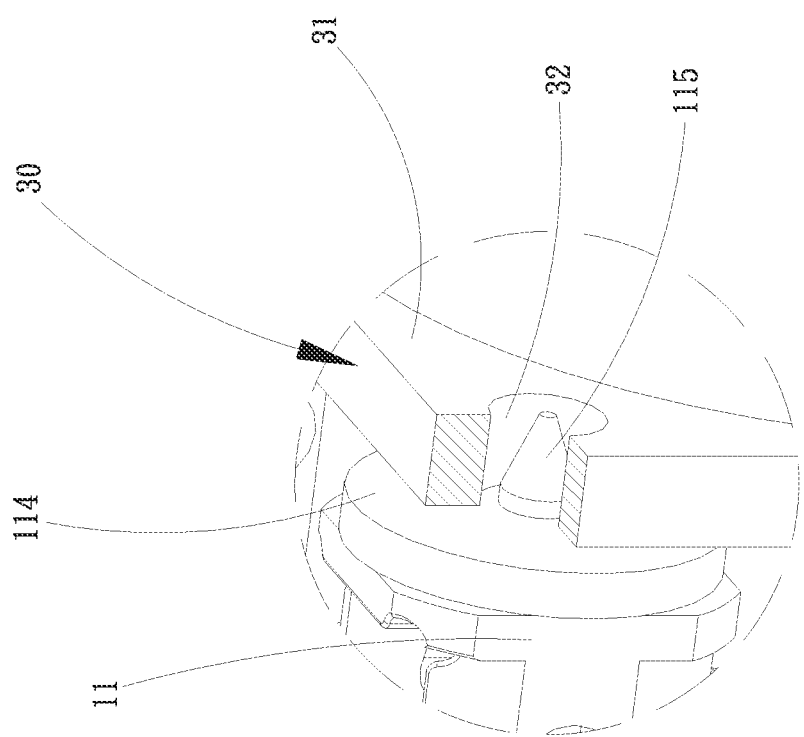
FIG. 3B is a partially enlarged view showing that the pin member of the present invention is correspondingly plugged into the fan mounting hole.

Please further refer to FIGS. 3A and 3B, which are schematic diagrams showing that the fan inspection jig of the present invention measures the vibration signal of the fan. Also referring to FIGS. 1A to 1C and FIGS. 2A to 2D, the fan 30 to be measured has a fan frame 31 defining a wind incoming side 311 and a wind outgoing side 312. A fan mounting hole 32 is disposed on each of four corners of the fan frame 31. One end of the signal wire 16 is connected with the signal connector 151 of the vibration sensor 15, while the other end of the signal wire 16 is connected with a signal capturing card 41. Via the signal capturing card 41, a computer 42 obtains the vibration value (such as vibration acceleration value) of the fan 30.

The fan 30 is such as, but not limited to, one single fan or a series fan. In operation, the fan 30 is first placed on the lifting bracket 25. The lifting bracket 25 serves to lift the fan 30 to the hollow space 23. The movable base seat 22 advances toward the fixed base seat 21, whereby the spring abutment pillars 10 of the movable base seat 22 and the fixed base seat 21 respectively extend into the corresponding fan mounting holes 32 of the wind incoming side 311 and the wind outgoing sides 312 of the fan 30 to hold the four corners of the fan frame 31. Once the fan 30 is held, the lifting bracket 25 is lowered to its home position. To speak more specifically, the pin member 115 of the first front end 111 of the front case body 11 of each spring abutment pillar 10 is correspondingly plugged into the fan mounting hole 32 of the fan frame 31 (as shown in FIG. 3B). The soft pad 114 contacts the fan frame 31 of the fan 30 by a face, whereby the fan 30 is held by the spring abutment pillars 10 to suspend in the hollow space 23. Then the fan 30 in the hollow space 23 is controlled to operate to a test revolution value (such as ten thousand revolutions). Then the vibration sensors 15 disposed in the spring abutment pillars 10 short-distance measure the vibration signal (such as vibration acceleration signal) generated by the fan 30 at the test revolution value so as to obtain the fan vibration signal.

The elastic members 13 of the spring abutment pillars 10 are disposed between the front case body 11 and the rear case body 12. This interrupts the interference of outer side (such as vibration of outer side) from being transmitted from the fixed base seat 21 and the movable base seat 22 to the vibration sensors 15. Moreover, the tested fan 30 is in a suspending state so that the fan vibration signal can be effectively obtained as pure as possible without being mingled with extra interference.

In the present invention, each of the fixed base seat 21 and the movable base seat 22 has four symmetrical spring abutment pillars 10 for holding and suspending the fan 30. Accordingly, the fan vibration signal of the fan 30 in operation is measured with the fan 30 positioned in a suspending position. This shortens the distance between the vibration sensors 15 and the fan 30 to be tested. Therefore, the vibration state of the fan 30 in operation can be measured by short distance to obtain the fan vibration signal without being mingled with extra interference. Furthermore, the soft pads 114 of the spring abutment pillars 10 provide proper softness to partially contact the tested fan 30. This reduces the error of the measured value due to the position change of the holding contact points of the jig.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A fan inspection jig for inspecting at least one fan with multiple mounting holes, the fan inspection jig comprising:
    a jig assembly having multiple spring abutment pillars, each of the spring abutment pillars including:
    a front case body having a first front end, a first rear end and a chamber, a pad being overlaid on the first front end to contact a fan frame of the fan, a pin member outward protruding from the first front end to pass through the pad in adaptation to the fan mounting hole, the chamber being positioned between the first front end and the first rear end;
    a rear case body having a second front end and a second rear end, the second front end facing the first rear end of the front case body, the second rear end being connected with the jig assembly; and
    an elastic member having a first connection end and a second connection end respectively connected with the first rear end of the front case body and the second front end of the rear case body, the elastic member further having a hollow passage between the first connection end and the second connection end, a vibration sensor being disposed in the chamber of at least one of the spring abutment pillars of each of two sides of the fan for measuring a vibration signal of the fan.

2. The fan inspection jig as claimed in claim 1, wherein the jig assembly further includes a fixed base seat and a movable base seat, which is forward or backward movable relative to the fixed base seat, a hollow space being defined between the fixed base seat and the movable base seat, the spring abutment pillars being respectively connected with the fixed base seat and the movable base seat for holding and suspending the fan in the hollow space.

3. The fan inspection jig as claimed in claim 2, wherein a lifting bracket is disposed under the hollow space for placing the fan thereon, the lifting bracket being connected with a lifting drive module, the lifting drive module including a lifting rod and a lifting drive source, one end of the lifting rod being connected with the lifting bracket, while the other end of the lifting rod being connected with the lifting drive source.

4. The fan inspection jig as claimed in claim 2, wherein the movable base seat has a movable base section connected with an extendable drive module, the extendable drive module having an extendable rod set, an extendable drive source and a connection rod set, the connection rod set having two elongated straight rods and a transverse bar, the two elongated straight rods being arranged in parallel to each other, one end of the elongated straight rods being connected with the movable base section, while the other end of the elongated straight rods being connected with the transverse bar, one end of the extendable rod set being connected with the transverse bar, while the other end of the extendable rod set being connected with the extendable drive source.

5. The fan inspection jig as claimed in claim 4, wherein the movable base section has two shaft holes, in which the two elongated straight rods of the extendable drive module are fitted, the movable base section being connected with a displacement module positioned between the extendable drive module and the movable base section, the displacement module having a fixed section positioned between the movable base section and the transverse bar of the extendable drive module, at least one elastic unit being connected between the movable base section and the fixed section.

6. The fan inspection jig as claimed in claim 2, wherein the fixed base seat has a fixed base section, the fixed base section having multiple locating sections arranged at intervals, the locating sections being spaced from the movable base seat by different distances, whereby a distance between the fixed base seat and the movable base seat is adjustable.

7. The fan inspection jig as claimed in claim 1, wherein the front case body is formed with at least one perforation in communication with the chamber, at least one retainer member having an abutment end being passed through the perforation into the chamber to abut against the vibration sensor, the first rear end of the front case body having a rear protruding body, which protrudes and extends into the hollow passage of one of the connection ends of the elastic member, a rear protruding wall protruding from an outer periphery of the first rear end around the rear protruding body, the first connection end of the elastic member being positioned between the rear protruding body and the rear protruding wall.

8. The fan inspection jig as claimed in claim 7, wherein a front protruding body is disposed at the second front end of the rear case body and correspondingly spaced from the rear protruding body of the front case body, the front protruding body protruding and extending into the hollow passage of the other connection end of the elastic member, a front protruding wall protruding from an outer periphery of the second front end around the front protruding body, the second connection end of the elastic member being positioned between the front protruding body and the front protruding wall.

9. The fan inspection jig as claimed in claim 8, wherein the rear protruding body of the front case body is a conic body having a conic end, the front protruding body of the rear case body being a hollow cylindrical body having a shaft hole corresponding to the conic end of the rear protruding body.

10. The fan inspection jig as claimed in claim 1, wherein each vibration sensor has a signal connector connected with a signal wire.

* * * * *